United States Patent [19]

Larson et al.

[11] Patent Number: 5,486,576
[45] Date of Patent: * Jan. 23, 1996

[54] METHOD FOR REDUCING MICROFOAM IN A SPRAY-APPLIED WATERBORNE THERMOSET COMPOSITION

[75] Inventors: Gary R. Larson, Hatfield; Caren A. Puschak, Norristown; Kurt A. Wood, Abington, all of Pa.

[73] Assignee: Rohm and Haas Company, Philadelphia, Pa.

[*] Notice: The portion of the term of this patent subsequent to Aug. 2, 2011, has been disclaimed.

[21] Appl. No.: 269,707

[22] Filed: Jul. 1, 1994

[51] Int. Cl.$^6$ ............................................. C08F 8/30
[52] U.S. Cl. ..................... 525/375; 524/460; 524/808; 524/812; 524/813; 525/329.9; 525/330.5; 525/374; 526/312; 528/44; 528/52
[58] Field of Search ............... 525/329.9, 330.5, 525/375; 528/44; 526/312; 524/808, 812, 813

[56] References Cited

U.S. PATENT DOCUMENTS

| | | |
|---|---|---|
| 4,539,361 | 9/1985 | Siol et al. . |
| 4,567,099 | 1/1986 | Van Gilder et al. . |
| 4,749,616 | 6/1988 | Liu et al. . |
| 4,954,559 | 9/1990 | Den Hartog ............... 524/507 |
| 5,021,469 | 6/1991 | Langerbeins et al. . |
| 5,066,705 | 11/1991 | Wickert ............... 524/457 |
| 5,185,396 | 2/1993 | Biale . |
| 5,215,783 | 6/1993 | Harper ............... 427/160 |
| 5,334,655 | 8/1994 | Carlson ............... 524/804 |

FOREIGN PATENT DOCUMENTS

| | | |
|---|---|---|
| 2090144 | 2/1993 | Canada . |
| 1619263 | 10/1967 | Germany . |

*Primary Examiner*—Fred Zitomer
*Attorney, Agent, or Firm*—Ronald D. Bakule

[57] ABSTRACT

A method for reducing the amount of microfoam in a spray-applied clear waterborne thermoset composition is provided, wherein the clear composition contains an emulsion-polymerized addition polymers or a multi-staged emulsion-polymerized addition polymers with an average particle diameter greater than about 120 nanometers and bearing at least two first reactive groups and a reactive modifier bearing at least two reactive groups is formed; is spray-applied to a substrate; and is cured. Also provided are substrates bearing such spray-applied clear compositions.

8 Claims, No Drawings

METHOD FOR REDUCING MICROFOAM IN A SPRAY-APPLIED WATERBORNE THERMOSET COMPOSITION

FIELD OF THE INVENTION

This invention relates to a method for reducing the amount of microfoam in a spray-applied clear waterborne thermoset composition.

BACKGROUND OF THE INVENTION

Waterborne thermoset compositions are curable compositions such as, for example, clear coatings which are frequently applied to substrates by spraying techniques. Some of the common spraying techniques used are, for example, air spray, airless spray, air-assisted airless spray, disc and bell spray, and high volume/low pressure spray. In air spray compressed air is critical to atomize the waterborne thermoset composition and to assist in conveying the droplets to the substrate. In airless, disc, and bell spray techniques the waterborne polymeric composition is atomized by mechanical means and the droplets are suspended in air on formation. Air-assisted airless spray is a hybrid of the two spray methods described above wherein air is used to convey the droplets which are formed mechanically; and high volume/low pressure spray is another commonly recognized variant of air spray.

Waterborne thermoset compositions frequently contain microfoam after they are applied to substrates by various spraying techniques. Microfoam remaining in a dried film formed from the spray-applied aqueous composition may detract from the appearance of the film, particularly from the appearance of a clear, or substantially unpigmented, film, which film may appear to be hazy. In addition the whitish cast which microfoam imparts may be manifested in high whiteness values in colorimetric measurements and in diminished distinctness of image (DOI) values, each with respect to a microfoam-free dried film formed from a composition containing an emulsion-polymerized addition polymer.

DESCRIPTION OF THE PRIOR ART

U.S. Pat. No. 4,749,616 discloses a heat-sealable coating composition containing an interpolymer which may be spray-applied as an essentially unpigmented composition, wherein the average particle size of the interpolymer component is from about 0.03 to about 0.5 microns.

U.S. Pat. No. 5,021,469 discloses a multiphase emulsion polymer wherein the emulsion polymer particles have an average diameter of less than 200 nanometers and a gloss paint formed therefrom, which may be applied by spray coating.

U.S. Pat. No. 5,185,396 discloses a polymeric emulsion which may be used as a binder for a water-based varnish wherein the particles of the polymeric emulsion are less than about 250 nanometers.

German Patent Application DE 1619263 discloses a latex for coating needled carpets with synthetic fabric backing. The styrene/butadiene latex polymer with a weighted average particle diameter of 0.16 to 0.3 microns avoids the formation of bubbles in the coating during drying.

None of the references discloses a method for reducing the amount of microfoam in a spray-applied clear waterborne thermoset composition.

SUMMARY OF THE INVENTION

A method for reducing the amount of microfoam in a spray-applied clear waterborne thermoset composition is provided: first, forming the composition which contains an emulsion-polymerized addition polymer with an average particle diameter of greater than about 120 nanometers, the polymer bearing at least two first reactive groups; and a reactive modifier bearing at least two second reactive groups, the second reactive groups being reactive with the first reactive groups; then, applying the clear composition to a substrate using a spray method; and then curing the clear composition.

DETAILED DESCRIPTION OF THE INVENTION

According to a first aspect of the present invention there is provided a method for reducing the amount of microfoam in a spray-applied clear waterborne thermoset composition: first, forming the composition which contains an emulsion-polymerized addition polymer with an average particle diameter of greater than about 120 nanometers, the polymer bearing at least two first reactive groups; and a reactive modifier bearing at least two second reactive groups, the second reactive groups being reactive with the first reactive groups; then, applying the clear composition to a substrate using a spray method; and curing the clear composition.

According to a second aspect of the present invention there is provided a method for reducing the amount of microfoam in a spray-applied clear waterborne thermoset composition: first, forming the composition which contains an emulsion-polymerized addition polymer with an average particle diameter of greater than about 120 nanometers and with a GPC weight average molecular weight from about 10,000 to about 150,000, the polymer bearing at least two first reactive groups; and a reactive modifier bearing at least two second reactive groups, the second reactive groups being reactive with the first reactive groups; then, applying the clear composition to a substrate using a spray method; and curing the clear composition.

According to a third aspect of the present invention there is provided a method for reducing the amount of microfoam in a spray-applied clear waterborne thermoset composition: first, forming the composition which contains multi-staged emulsion-polymerized addition polymer particles, the particles having an inner phase and an outer phase with an average particle diameter of greater than about 120 nanometers, wherein the polymer has a GPC weight average molecular weight from about 10,000 to about 150,000, the multi-staged addition polymer bearing at least two first reactive groups, and a reactive modifier bearing at least two second reactive groups, the second reactive groups being reactive with the first reactive groups; then, applying the clear composition to a substrate using a spray method; and curing the clear composition.

According to a fourth aspect of the present invention there is provided a substrate bearing a cured spray-applied clear waterborne thermoset composition with a reduced amount of microfoam.

A "waterborne thermoset composition" herein is defined as a composition containing an emulsion-polymerized water-insoluble addition polymer bearing at least two first reactive groups; and a reactive modifier bearing at least two second reactive groups. The first reactive groups are reactive with the second reactive groups under curing conditions, providing a cured thermoset, or crosslinked, or cured polymeric composition. The waterborne thermoset composition may contain water or a mixture of water and at least one water-miscible solvent which does not substantially enter into reactions with either the first or the second reactive groups, such as, for example, in some instances, isopropanol, ethylene glycol butyl ether, and propylene glycol propyl ether.

The emulsion-polymerized addition polymer in the clear waterborne thermoset composition may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. Low levels of copolymerized ethylenically-unsaturated acid monomers such as, for example, 0.1%–7%, by weight based on the weight of the emulsion-polymerized polymer, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate, may be used. At least two first reactive groups such as, for example, hydroxyl groups and amino groups are incorporated into the emulsion-polymerized addition polymer in the form of first reactive group-functional monomers or precursors thereof; the copolymerized ethylenically-unsaturated acid monomers may also function as the sole first reactive groups.

The emulsion-polymerized polymer used in this invention is a substantially thermoplastic, or substantially uncrosslinked, polymer when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,4-butylene glycol dimethacrylate, 1,6-hexanedioldiacrylate, divinyl benzene, and the like, may be used. It is important, however, that the quality of the film formation is not materially impaired.

The glass transition temperature of the emulsion-polymerized addition polymer is from about 5 C. to about 85 C., as measured by differential scanning calorimetry (DSC). The emulsion polymer samples were dried, preheated to 120 C., rapidly cooled to −100 C., and then heated to 150 C. at a rate of 20 C./minute while data was being collected. The Tg was measured at the midpoint using the half-height method.

The polymerization techniques used to prepare such emulsion-polymerized addition polymers are well known in the art. Conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

Chain transfer agents such as, for example, mercaptans may be used in an amount effective to provide a GPC weight average molecular weight of about 10,000 to about 150,000. "GPC weight average molecular weight", as used herein, is defined as the weight average molecular weight determined by high volume gel permeation chromatography (GPC) measured on a DMF solution of polymer. The detailed procedure is presented herein in the examples.

The average particle diameter of the emulsion-polymerized polymer particles is greater than about 120 nanometers. Preferred is an average particle diameter from about 120 nanometers to about 500 nanometers. Particle diameters less than about 120 nanometers yield spray-applied clear films with greater amounts of microfoam.

In another aspect of the present invention the emulsion-polymerized addition polymer is prepared by a multistage emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique.

Polymeric particles formed by multistage emulsion addition polymerization process are composed of two or more phases of various geometries such as, for example, core/shell or core/sheath particles, core/shell particles with shell phases incompletely encapsulating the core, core/shell particles with a multiplicity of cores, interpenetrating network particles, and the like. In all of these cases the majority of the surface area of the particle will be occupied by at least one outer phase and the interior of the particle will be occupied by at least one inner phase.

Preferred is a two-staged emulsion-polymerized addition polymer particle with an outer phase containing from about 20% to about 80%, by weight based on the total weight of the particle. Preferred is a two-staged emulsion-polymerized addition polymer particle with an outer phase having a glass transition temperature (Tg), as determined by DSC, which is at least about 30 C. lower than the Tg of the inner phase. Preferred is a multi-staged emulsion-polymerized addition polymer with at least two first reactive groups in the outer phase. Preferred is a multi-staged emulsion-polymerized addition polymer particle with a particle diameter from about 120 nanometers to about 500 nanometers. More preferred is a multi-staged emulsion-polymerized addition polymer particle with a particle diameter from about 120 nanometers to about 200 nanometers. Preferred is a multi-staged emulsion-polymerized addition polymer which has a GPC weight average molecular weight less than about 150,000. More preferred is a multi-staged emulsion-polymerized addition polymer particle with a GPC weight average molecular weight less than about 100,000.

Each of the stages of the multi-staged emulsion-polymerized polymer may contain the same monomers, chain transfer agents, etc. as disclosed herein-above for the emulsion-polymerized addition polymer. The emulsion polymerization techniques used to prepare such dispersions are well known in the art such as, for example, as are disclosed in U.S. Pat. Nos. 4,325,856; 4,654,397; and 4,814,373; hereby incorporated herein by reference.

In addition to the emulsion-polymerized addition polymer, the clear waterborne thermoset composition contains a reactive modifier bearing at least two second reactive groups. The reactive modifier bearing at least two second reactive groups has a GPC weight average molecular weight from about 200 to 10,000,000 and may be present as a solution or a dispersion in the waterborne composition.

The first reactive groups and the second reactive groups react to form covalent bonds under the curing conditions. Complementary pairs of first and second reactive groups include, for example: hydroxyl-isocyanate, amine-isocyanate; acetoacetate-isocyanate; carboxylic acid-carbodiimide; aldehyde-hydrazide; acid-aziridine; acid-epoxy; amine-epoxy; amine-aldehyde; hydroxyl-melamine; and acid-anhydride. The first or second reactive group in each pair may be present in the emulsion-polymerized addition polymer or in the reactive modifier. Preferred are first reactive groups selected from the group consisting of hydroxyl groups, amino groups, and acetoacetate groups when the second reactive groups are isocyanate groups. Also preferred are carboxylic acid first reactive groups when the second reactive groups are carbodiimide or aziridine groups.

The solids content of the clear waterborne thermoset composition may be about 20% to about 70% by weight. The viscosity of the waterborne polymeric composition may be from about 50 centipoises to about 10,000 centipoises, as measured using a Brookfield viscometer (Model LVT using spindle #3 at 12 rpm); the viscosities appropriate for different spraying methods vary considerably.

The clear waterborne thermoset composition contains no ingredients which cause substantial opacity in the dried coating at the applied dry film thickness, which is typically from about 0.1 mil to about 5 mils. The dried coating may be applied as one coat or as multiple coats, with or without drying between coats. The waterborne thermoset composition may contain, in addition to the emulsion-polymerized addition polymer and the reactive modifier, conventional components such as, for example, emulsifiers, substantially transparent pigments and fillers, dispersants, coalescing agents, flatting agents, curing agents, thickeners, humectants, wetting agents, biocides, plasticizers, antifoaming agents, colorants, waxes, and anti-oxidants. The spray-applied clear waterborne thermoset composition is applied to a substrate such as, for example, metal, wood, and plastic, using a spraying method. Preferred substrates are wood and automotive substrates. The composition may be applied to wood such as, for example, wood, sealed wood, particle board treated with a UV-cured filler, painted wood, and previously coated wood; or to metal such as, for example, metal, treated metal, metal coated with an electrodeposited primer, and previously painted metal; or to plastic such as, for example, plastic, plastic alloys, and reinforced plastic (such as RIM substrate). The spraying method may be, for example, air-assisted spray, airless spray, bell or disc spraying, high volume/low pressure spray, and air-assisted electrostatic spray. In such spraying methods the waterborne polymeric composition is atomized, or formed into small droplets, which are conveyed to the substrate where the droplets form into a substantially continuous film. In such spray-applied methods the atomized droplets of the waterborne polymeric composition are formed in contact with and/or admixed with a gas such as, for example, air. The gas, under pressure, may be required to atomize the coating such as, for example, in conventional air spray applications; the gas may flow towards the substrate and provide for at least some of the conveying of the atomized composition such as, for example, in air-assisted airless spray application; or the gas may be the medium through which the atomized composition, atomized by mechanical action in the presence of the gas such as, for example, in airless spray, disc, and bell applications, with or without electrostatic assistance, moves to the substrate. Occlusions of gas, "microfoam", typically are found in the waterborne polymeric composition after its application to the substrate. The microfoam is undesirable; microfoam may cause haze or opacity in clear or substantially unpigmented coatings or films.

The clear thermoset composition may be cured at ambient temperature or at elevated temperatures, with or without catalysts which facilitate cure, or reaction between the first reactive groups and the second reactive groups. Preferred is a curing temperature from about 20 C. to about 250 C. "Microfoam" herein is defined as substantially spherical gas-filled occlusions in the dried film which are typically 10–20 micrometers in radius. The microfoam occlusions lack sufficient buoyancy to escape from the waterborne polymeric composition before they become substantially immobilized in the applied composition. The "amount of microfoam" as used herein is determined by counting the number of bubbles in a selected area of the applied waterborne composition, using an optical microscope under 70× magnification. The absolute amount of microfoam is influenced by spray equipment, spray conditions, and environmental conditions such as, for example, temperature, humidity, and air flow. The method for reducing microfoam of this invention relates to the reduction of the amount of microfoam observed in a spray-applied clear composition relative to the amount of microfoam observed in a comparative sample, both prepared under the same conditions.

The following examples are intended to illustrate the method for reducing the amount of microfoam in a spray-applied waterborne thermoset composition. They are not intended to limit the invention as other applications of the invention will be obvious to those of ordinary skill in the art.

EXPERIMENTAL METHODS

Measurement of GPC Weight Average Molecular Weight

Samples for GPC molecular weight determination were prepared by dissolving 25 mg. of soluble polymer in distilled, reagent grade dimethylformamide (DMF) at a concentration of 2.5 mg./ml. by shaking for 24 hours. A sample volume of 0.1 ml. of the polymer system was injected onto a Type A (20 micron) gel column 60 cm. in length prepared by Polymer Laboratories; a flow rate of 0.6 ml./min. was used. The sampling rate was 2.5 points per min. Data acquisition was by a Hewlett-Packard HP-3852 computer. Molecular weight calibration was carried out before each sample using polymethyl methacrylate and data analysis was accomplished with a Hewlett-Packard HP-1000 computer running RTE-A.

Instrument: Waters 150C GPC

Data System: Maxima 820 CPC software from Waters

Columns:
    (2 columns) −30 cm, 7.5 mm ID, PLgel mixed bed 10 micron column
    (1 column) −30 cm, 7.8 mm ID, Waters 10E3 Ultrastyragel column Mobile Phase DMF/LiBr; 2.6 grams LiBr in 1500 ml DMF Flow Rate: 1.0 ml/min nominal Temperature: 60° C.

Calibrants: Polystyrene (from 2,880,000 g/mole down to 1350 g/mole)

Injection: 100 microliters

Concentration: Approx. 2.5 mg polymer solids per ml

Standards were checked before and after every series of 11 samples. Molecular weights are reported in polystyrene equivalents both as number average molecular weight, Mn and as weight average molecular weight, Mw. Samples were filtered through 5.0 micron, 25 OD membrane filters; Millex LS.

Particle Size Determination

The particle diameter of the particles was determined using a Brookhaven BI-90 Particle Sizer which employs a light scattering technique. To measure the particle size a sample of 0.1 to 0.2 grams of as is aqueous dispersion was diluted to a total of 40 cc with distilled water. A 2 cc portion was delivered into an acrylic cell which was then capped. The particle size was measured for 1000 cycles. The measurement was repeated three times and the average of three values was reported in nanometers.

Color Measurement (L*)

The color of films sprayed on smooth glossy black glass was measured using a COLORGARD(R) System/05 Colorimeter, 556 series (COLORGARD is a trademark of Pacific Scientific, Inc.) using the CIELAB* system of color measurement. Microfoam lends a whitish cast to a clear film which may be quantified by the "L*" value in the CIELAB (1976) color standards or, alternatively, the "L" value in the Hunter Lab coordinate system. An L* value less than about 5 corresponds to a barely noticeably hazy film whereas an L* value greater, than about 10 corresponds to a very hazy-appearing film when the coating is sprayed on a black substrate such as, for example, glass and coated black paper.

EXAMPLE 1

Preparation of clear waterborne thermoset compositions containing emulsion-polymerized addition polymers of various molecular weights and particle sizes bearing at least two hydroxyl or acetoacetate first reactive groups and a reactive modifier bearing at least two isocyanate second reactive groups.

Preparation of Samples 1–2 and Comparative samples A–C.

To a 5 liter stirred reactor 1383.0 g. deionized water (DI water) and 48.2 g. of an aqueous solution of sodium dodecyl bezene sulfonate (23% active ingredient) which had been heated to 85° C. was added 43.4 g. of Monomer Emulsion (ME) which was then rinsed into the reactor with 15 g. of DI water. A solution of 2.08 g. of ammonium persulfate in 15.0 g. DI water and a solution of 2.08 g. sodium carbonate in 45 g. DI water was then added. Ten minutes after the first addition, the temperature was 85° C. and the uniform addition of the remainder of ME and a solution of 2.08 g. ammonium persulfate in 150.0 g. DI water were begun. The temperature remained at 85° C. over the 180 minute period during which ME and catalyst was added. The final reaction mixture was neutralized to pH of 7.5 with 29% aqueous ammonia.

For Samples 1–2, the same procedure was followed with the exception that 12.6 g. sodium dodecylbenzene sulfonate was used in the kettle charge.

| Monomer Emulsion | |
|---|---|
| Sample 1 | |
| DI water | 425.60 |
| sodium dodecyl benzene sulfonate | 12.56 |
| Butyl Acrylate | 708.08 |
| Methyl Methacrylate | 511.32 |
| Acetoacetoxy ethyl Methacrylate | 138.60 |
| Methacrylic acid | 27.71 |
| 1-Dodecanethiol @ 98% | 13.85 |
| Sample 2 | |
| DI water | 425.60 |
| sodium dodecyl benzene sulfonate | 12.56 |
| Butyl Acrylate | 708.08 |
| Methyl Methacrylate | 511.32 |
| Hydroxyethyl Methacrylate | 138.60 |
| Methacrylic acid | 27.71 |
| 1-Dodecanethiol @ 98% | 13.85 |
| Comparative sample A | |
| DI water | 425.60 |
| sodium dodecyl benzene sulfonate (23% active) | 87.36 |
| Butyl Acrylate | 806.48 |
| Methyl Methacrylate | 551.51 |
| Methacrylic acid | 27.71 |
| Comparative Sample B | |
| DI water | 425.60 |
| sodium dodecyl benzene sulfonate (23% active) | 87.36 |
| Butyl Acrylate | 708.08 |
| Methyl Methacrylate | 511.32 |
| Acetoacetoxy ethyl Methacrylate | 138.60 |
| Methacrylic acid | 27.71 |
| Comparative Sample C | |
| DI water | 425.60 |
| sodium dodecyl benzene sulfonate(23% active) | 87.36 |
| Butyl Acrylate | 708.08 |
| Methyl Methacrylate | 511.32 |
| Hydroxyethyl Methacrylate | 138.60 |
| Methacrylic acid | 27.71 |

Waterborne thermoset compositions were formed from Samples 1–2 and Comparative samples A–C using the following procedure. To 100g. of emulsion-polymerized addition polymer were added 1.0 g. dipropyleneglycol methyl ether, 7.6 g. BAYHYDROL(R) XP-7043-PMN (BAYHYDROL is a trademark of Miles Co.; BAYHYDROL(R) XP-7043-PMN is a water-dispersible polyisocyanate bearing at least two isocyanate groups), and 4.5 g. of a 1% solids in water solution of ACRYSOL(R) RM-825 (ACRYSOL is a trademark of Rohm and Haas Co.; ACRYSOL(R) RM-825 is a rheology modifier). The viscosity of the waterborne thermoset composition was then adjusted to 23–26 sec. #2 Zahn by addition of water or a 1% solids in water solution of ACRYSOL(R) RM-825.

EXAMPLE 2

Evaluation of spray-applied clear waterborne thermoset compositions.

Samples 1–2 and Comparative samples A–C were each spray applied over a black glass panel. A conventional suction-feed spray gun (DeVilbiss MBC) with an EX tip and a #30 air cap was used. The gas pressure was 45 psi. Each panel was sprayed with one coat of one of the compositions. The panels were sprayed under the same temperature and humidity conditions (102° F./20%RH) and were dried in these conditions. The dried panels were evaluated for microfoam density (reported as bubbles/mm$^2$) and color (L*). The results are given in Table 2.1 below. Also given in Table 2.1 is the particle diameter, number average molecular weight, $M_n$, and weight average molecular weight, $M_w$, for each of the emulsion polymers included in the waterborne thermoset compositions.

TABLE 2.1

Evaluation of cured isocyanate-containing compositions

| Polymer | 10$^3$ Mn | 10$^3$ Mw | Part. size (nm) | bubbles | L* |
|---|---|---|---|---|---|
| Sample 1 | 34 | 93 | 200 | 88 | 1.61 |
| Sample 2 | 40 | 68 | 200 | 16 | 0.41 |
| Comp. A | 68 | 214 | 81 | 432 | 4.83 |
| Comp. B | 48 | 48 | 80 | 264 | 9.08 |
| Comp. C | 110 | 276 | 80 | 96 | 4.55 |

Samples 1–2 of this invention exhibit lower levels of microfoam than Comparative samples A–C as measured both by bubble counting or color (L*) measurement.

EXAMPLE 3

Preparation and evaluation of clear waterborne thermoset compositions containing emulsion-polymerized multi-staged addition polymers of various molecular weights and particle sizes bearing at least two hydroxyl or acetoacetate first reactive groups and a reactive modifier bearing at least two isocyanate second reactive groups.

Preparation of Samples 3–4 and Comparative Samples D–E

To a 5 liter stirred reactor 1383.0 g. deionized water (DI water) and 3.0 g. of an aqueous solution of sodium dodecyl benzene sulfonate (23% active ingredient) which had been heated to 85° C. was added 43.4 g. of Monomer Emulsion #1 (ME#1) which was then rinsed into the reactor with 15 g. of DI water. A solution of 2.08 g. of ammonium persulfate in 15.0 g. DI water and a solution of 2.08 g. sodium carbonate in 45 g. DI was then added. Ten minutes after the first addition, the temperature was 85° C. and the uniform addition of the remainder of ME #1 and a solution of 1.04 g. ammonium persulfate in 75.0 g. DI water were begun. The temperature remained at 85° C. over the 90 minute period during which ME #1 and the cofeed catalyst #1 was added. Thirty minutes later, the temperature was 85° C. and the addition of Monomer Emulsion #2 (ME #2) and catalyst #2 was begun. The temperature was 85° C. during the 90 minute period which ME #2 and Catalyst #2 was added. The final reaction mixture was neutralized to pH of 7.5 with 29% aqueous ammonia. The two polymer stages are mutually incompatible.

Comparative samples D–E were prepared in the same manner with the exception that 48.2 g. of an aqueous solution of sodium dodecyl benzene sulfonate –23% active ingredient was used in the kettle charge.

| Sample 3 | |
|---|---|
| Monomer Emulsion #1 | |
| DI water | 212.84 |
| sodium dodecyl benzene sulfonate (23% active) | 6.28 |
| Methyl Methacrylate | 557.02 |
| Butyl Acrylate | 73.43 |
| Styrene | 55.42 |
| Methacrylic acid | 6.93 |
| Monomer Emulsion #2 | |
| DI water | 212.84 |
| sodium dodecyl benzene sulfonate (23% active) | 6.29 |
| Butyl Acrylate | 372.70 |
| Methyl Methacrylate | 146.90 |
| Acetoacetoxy ethyl Methacrylate | 138.6 |
| Methacrylic acid | 34.63 |
| 1-Dodecenanethiol @ 98% | 6.92 |
| Sample 4 | |
| Monomer Emulsion #1 | |
| DI Water | 212.80 |
| sodium dodecyl benzene sulfonate (23% active) | 6.28 |
| Methyl Methacrylate | 557.02 |
| Butyl Acrylate | 73.43 |
| Styrene | 55.42 |
| Methacrylic Acid | 6.93 |
| Monomer Emulsion #2 | |
| DI water | 212.80 |
| sodium dodecyl benzene sulfonate (23% active) | 6.28 |
| Butyl Acrylate | 372.70 |
| Methyl Methacrylate | 146.90 |
| Hydroxyethyl Methacrylate | 138.60 |
| Methacrylic acid | 34.64 |
| 1-Dodecanethiol @ 98% | 6.92 |
| Comparative sample D | |
| Monomer Emulsion #1 | |
| DI water | 212.84 |
| sodium dodecyl benzene sulfonate (23% active) | 43.68 |
| Methyl Methacrylate | 557.02 |
| Butyl Acrylate | 73.43 |
| Styrene | 55.42 |
| Methacrylic acid | 6.93 |
| Monomer Emulsion #2 | |
| DI water | 212.84 |
| sodium dodecyl benzene sulfonate (23% active) | 43.68 |
| Butyl Acrylate | 372.70 |
| Methyl Methacrylate | 146.90 |
| Acetylacetoxy ethyl Methacrylate | 138.60 |
| Methacrylic acid | 34.60 |
| Comparative sample E | |
| Monomer Emulsion #1 | |
| DI water | 212.84 |
| sodium dodecyl benzene sulfonate (23% active) | 43.68 |
| Methyl Methacrylate | 557.02 |
| Butyl Acrylate | 73.43 |
| Styrene | 55.42 |
| Methacrylic acid | 6.93 |
| Monomer Emulsion #2 | |
| DI water | 212.84 |
| sodium dodecyl benzene sulfonate (23% active) | 43.68 |
| Butyl Acrylate | 372.70 |
| Methyl Methacrylate | 146.90 |
| Hydroxyethyl Methacrylate | 138.60 |
| Methacrylic acid | 34.60 |

Waterborne thermoset compositions were formed from Samples 3–4 and Comparative samples D–E using the following procedure. To 173.6 g. of emulsion-polymerized addition polymer (weight selected in each case to give 65 g. of polymer solids) were added 3.9 g. ethyleneglycol butyl ether, 13 g. BAYHYDUR(TM) XP-7063 (BAYHYDUR(T-

M)is a trademark of Miles Co.; BAYHYDUR(TM) XP-7063 is a water-dispersible polyisocyanate bearing at least two isocyanate groups), 10 g. water, and 10.6 g. of a 1% solids in water solution of ACRYSOL(R) RM-825 (ACRYSOL-(R)is a trademark of Rohm and Haas Co.; ACRYSOL(R) RM-825 is a rheology modifier). The viscosity of the waterborne thermoset composition was then adjusted to 23–26 sec. #2 Zahn by addition of water or a 1% solids in water solution of ACRYSOL(R) RM-825. The waterborne thermoset compositions were spray applied as in Example 2 under conditions of 99 F. and 20% relative humidity.

TABLE 3.1

Evaluation of cured isocyanate-containing compositions

| Polymer | $10^3$ Mn | $10^3$ Mw | Part. size (nm) | bubbles | L* |
|---|---|---|---|---|---|
| Sample 3 | 54 | 199 | 202 | 132 | 7.36 |
| Sample 4 | 59 | 157 | 201 | 96 | 5.72 |
| Comp. D | 69 | 183 | 71 | 236 | 11.14 |
| Comp. E | 110 | 243 | 76 | 296 | 12.66 |

Samples 3–4 of this invention exhibit lower levels of microfoam than Comparative samples D–E as measured both by bubble counting or color (L*) measurement.

EXAMPLE 4

Preparation and evaluation of clear waterborne thermoset compositions containing emulsion-polymerized addition polymers of various particle sizes bearing at least two carboxylic acid first reactive groups and a reactive modifier bearing at least two carbodiimide second reactive groups.

Preparation of Samples 5–7 and Comparative Samples F–G

To a 5 liter stirred reactor 1444.28 g. deionized water (DI water) and 124.87 g. of an aqueous solution of sodium dodecylbezene sulfonate (23% active ingredient) which had been heated to 85° C. was added 51.28 g. of Monomer Emulsion which was then rinsed into the reactor with 35 g. of DI water. A solution of 3.63 g. of ammonium persulfate in 40.0 g. DI water and a solution of 5.46 g. sodium carbonate in 70 g. DI water was then added. Ten minutes after the first addition, the temperature was 85° C. and the uniform addition of the remainder of ME and a solution of 0.91 g. ammonium persulfate in 111.0 g. DI water were begun. The temperature remained at 85° C. over the 180 minute period during which ME and catalyst was added. The final reaction mixture was neutralized to pH of 7.6 with 29% aqueous ammonia.

For sample 5, the procedure above was followed with the exception that 1514.0 g. DI H20 and 3.96 g. of an aqueous solution of sodium dodecylbezene sulfonate (23% active ingredient) were used in the kettle charge.

| Monomer Emulsion for Sample 5 | |
|---|---|
| DI water | 535.23 |
| Anionic Surfactant (23% active) | 96.04 |
| Butyl Methacrylate | 924.65 |
| Methyl Methacrylate | 493.15 |
| Butyl Acrylate | 331.79 |
| Methacrylic acid | 63.46 |

For sample 6, the procedure above was followed with the exception that 1514.0 g. DI H20 and 7.87 g. of an aqueous solution of sodium dodecylbezene sulfonate (23% active ingredient) were used in the kettle charge.

| Monomer Emulsion for Sample 6 | |
|---|---|
| DI water | 535.23 |
| Anionic Surfactant (23% active) | 92.13 |
| Butyl Methacrylate | 924.65 |
| Methyl Methacrylate | 493.15 |
| Butyl Acrylate | 331.79 |
| Methacrylic acid | 63.46 |
| 1-Dodecanethiol @ 98%* | 18.13 |

*CTA is added after preform is removed

For sample 7, the procedure above was followed with the exception that 1514.0 g. DI H20 and 11.17 g. of an aqueous solution of sodium dodecylbezene sulfonate (23% active ingredient) were used in the kettle charge.

| Monomer Emulsion for Sample 7 | |
|---|---|
| DI water | 535.23 |
| Anionic Surfactant (23% active) | 88.17 |
| Butyl Methacrylate | 924.65 |
| Methyl Methacrylate | 493.15 |
| Butyl Acrylate | 331.79 |
| Methacrylic acid | 63.46 |
| 1-Dodecanethiol @ 98% | 1.81 |
| Monomer Emulsion for Comparative sample F | |
| DI water | 604.93 |
| Anionic Surfactant (23% active) | 14.52 |
| Butyl Methacrylate | 924.65 |
| Methyl Methacrylate | 493.15 |
| Butyl Acrylate | 331.79 |
| Methacrylic acid | 63.46 |
| Monomer Emulsion for Comparative sample G | |
| DI water | 604.93 |
| Anionic Surfactant (23% active) | 14.52 |
| Butyl Methacrylate | 924.65 |
| Methyl Methacrylate | 493.14 |
| Butyl Acrylate | 331.79 |
| Methacrylic acid | 63.46 |
| 1-Dodecanethiol | 18.13 |

Samples 5–7 and Comparative samples F–G were incorporated into clear coating compositions using the following procedure. To 85.3 g. latex polymer was added, in the order given, with stirring, 7 g. of a 4/3/1 premixture of water/ethylene glycol butyl ether/diethyleneglycol butyl ether, 0.2 g. BYK(R) 346 wetting aid (BYK(R) is a trademark of Byk Mallinkrodt Co.), TEGOGLIDE(R) 410 slip aid (50% in ethylene glycol butyl ether) (TEGOGLIDE(R) is a trademark of Tegochemie Service U.S.A., 2 g. MICHEMLUBE(R) 39235 mar aid (MICHEMLUBE(R) is a trademark of Michelman Chemical Co., 6.2 g. of aromatic carbodiimide, and 3 g. of ACRYSOL(R) RM-825 urethane rheology modififer (ACRYSOL(R) is a trademark of Rohm and Haas Co.). Each coating composition was adjusted to 23–26 seconds on a #2 Zahn cup. Coating compositions were sprayed according to the procedure of Example 2 under conditions of 103 F. and 16% relative humidity. Results are presented in Table 4.1.

TABLE 4.1

Evaluation of cured aromatic carbodiimide-containing compositions

| Polymer | $10^3$ Mn | $10^3$ Mw | Part. size (nm) | bubbles | L* |
|---|---|---|---|---|---|
| Sample 5 | 82 | 426 | 200 | 4 | 1.93 |
| Sample 6 | 26 | 41 | 159 | 12 | 0.64 |
| Sample 7 | 67 | 173 | 138 | 60 | 1.29 |
| Comp. F | 74 | 318 | 74 | 112 | 4.14 |
| Comp. G | 28 | 47 | 77 | 116 | 3.13 |

Samples 5–7 of this invention exhibit lower levels of microfoam than Comparative samples F–G as measured both by bubble counting or color (L*) measurement.

EXAMPLE 5

Preparation of clear waterborne thermoset compositions containing emulsion-polymerized multi-staged addition polymers of various molecular weights bearing at least two carboxylic acid first reactive groups and a reactive modifier bearing at least two carbodiimide second reactive groups.

Preparation of Samples 8–14 and Comparative Samples H–J

To a 5 liter stirred reactor 1085.0 g. deionized water (DI water) and 42.48 g. of an aqueous solution of anionic surfactant (ammonium salt of a sulfate ester of an alkylphenoxypoly(ethyleneoxy)ethanol −58% active ingredient) which had been heated to 85° C. under nitrogen was added a solution of 3.0 g. sodium carbonate in 75 g. DI water and a solution of 4.0 g. of ammonium persulfate in 20.0 g. DI water. Eight minutes after the first addition, the temperature was 85° C. and the uniform addition of ME #1 and a solution of 1.24 g. ammonium persulfate in 62.0 g. DI water were begun. The temperature remained at 85° C. over the 112 minute period during which ME #1 and the cofeed catalyst was added. Thirty minutes later, the temperature was 85° C. and the addition of Monomer Emulsion #2 (ME #2) and a solution of 0.76 g. ammonium persulfate in 38.0 g. DI water was begun. The temperature was 85° C. during the 68 minute period which ME #2 and Catalyst #2 was added. The final reaction mixture was neutralized to pH=7.5 with 29% aqueous ammonia. The two polymer stages are mutually incompatible.

| Comparative Sample H | |
|---|---|
| Monomer Emulsion #1 | |
| DI water | 297.90 |
| Anionic Surfactant (58% active) | 6.59 |
| Butyl Acrylate | 640.67 |
| Methyl Methacrylate | 275.94 |
| Methacrylic acid | 38.19 |
| Monomer Emulsion #2 | |
| DI water | 297.90 |
| Anionic Surfactant (58% active) | 4.03 |
| Butyl Acrylate | 62.62 |
| Methyl Methacrylate | 510.88 |
| Methacrylic acid | 11.701 |
| Comparative sample I | |
| Monomer Emulsion #1 | |
| DI water | 272.90 |
| Anionic Surfactant (58% active) | 6.59 |
| Butyl Acrylate | 640.67 |
| Methyl Methacrylate | 275.94 |
| Methacrylic acid | 38.19 |
| 1-Dodecanethiol | 2.39 |
| Monomer Emulsion #2 | |
| DI water | 272.90 |
| Anionic Surfactant (58% active) | 4.03 |
| Butyl Acrylate | 62.62 |
| Methyl Methacrylate | 510.88 |
| Methacrylic acid | 11.70 |
| Comparative sample J | |
| Monomer Emulsion #1 | |
| DI water | 297.90 |
| Anionic Surfactant (58% active) | 6.59 |
| Butyl Acrylate | 640.67 |
| Methyl Methacrylate | 275.94 |
| Methacrylic acid | 38.19 |
| 1-Dodecanethiol | 9.55 |
| Monomer Emulsion #2 | |
| DI water | 272.90 |
| Anionic Surfactant (58% active) | 4.03 |
| Butyl Acrylate | 62.62 |
| Methyl Methacrylate | 510.88 |
| Methacrylic acid | 11.70 |

For sample 8, the procedure above was followed with the exception that 1.33 g. of an aqueous solution of anionic surfactant (ammonium salt of a sulfate ester of an alkylphenoxypoly(ethyleneoxy) ethanol −58% active ingredient ) was used in the kettle charge.

| Sample 8 | |
|---|---|
| Monomer Emulsion #1 | |
| DI water | 297.90 |
| Anionic Surfactant (58% active) | 12.34 |
| Butyl Acrylate | 640.67 |
| Methyl Methacrylate | 275.94 |
| Methacrylic acid | 38.19 |
| 1-Dodecanethiol | 19.1 |
| Monomer Emulsion #2 | |
| DI water | 297.90 |
| Anionic Surfactant (58% active) | 7.57 |
| Butyl Acrylate | 62.62 |
| Methyl Methacrylate | 510.88 |
| Methacrylic acid | 11.70 |

For sample 9, the procedure above was followed with the exception that 1.33 g. of an aqueous solution of anionic surfactant (ammonium salt of a sulfate ester of an alkylphenoxypoly(ethyleneoxy) ethanol −58% active ingredient) was used in the kettle charge.

| Sample 9 | |
|---|---|
| Monomer Emulsion #1 | |
| DI water | 297.90 |
| Anionic Surfactant (58% active) | 12.34 |
| Butyl Acrylate | 640.67 |
| Methyl Methacrylate | 275.94 |
| Methacrylic acid | 38.19 |
| Monomer Emulsion #2 | |
| DI water | 297.90 |
| Anionic Surfactant (58% active) | 7.57 |
| Butyl Acrylate | 62.62 |
| Methyl Methacrylate | 510.88 |

| Sample 9 | |
|---|---|
| Methacrylic acid | 11.70 |

For sample 10, the procedure above was followed with the exception that 1.33 g. of an aqueous solution of anionic surfactant (ammonium salt of a sulfate ester of an alkylphenoxypoly(ethyleneoxy)ethanol –58% active ingredient ) was used in the kettle charge.

| Sample 10 | |
|---|---|
| Monomer Emulsion #1 | |
| DI water | 297.90 |
| Anionic Surfactant (58% active) | 12.84 |
| Butyl Acrylate | 640.67 |
| Methyl Methacrylate | 275.94 |
| Methacrylic acid | 38.19 |
| Monomer Emulsion #2 | |
| DI water | 297.90 |
| Anionic Surfactant (58% active) | 7.86 |
| Butyl Acrylate | 62.62 |
| Methyl Methacrylate | 510.88 |
| Methacrylic acid | 11.70 |

For sample 11, the procedure above was followed with the exception that 1.33 g. of an aqueous solution of anionic surfactant (ammonium salt of a sulfate ester of an alkylphenoxypoly(ethyleneoxy) ethanol –58% active ingredient) was used in the kettle charge.

| Sample 11 | |
|---|---|
| Monomer Emulsion #1 | |
| DI water | 297.90 |
| Anionic Surfactant (58% active) | 12.34 |
| Butyl Acrylate | 640.67 |
| Methyl Methacrylate | 275.94 |
| Methacrylic acid | 38.19 |
| 1-Dodecanethiol | 0.96 |
| Monomer Emulsion #2 | |
| DI water | 297.90 |
| Anionic Surfactant (58% active) | 7.57 |
| Butyl Acrylate | 62.62 |
| Methyl Methacrylate | 510.88 |
| Methacrylic acid | 11.70 |

For sample 12, the procedure above was followed with the exception that 0.40 g. of an aqueous solution of anionic surfactant (ammonium salt of a sulfate ester of an alkylphenoxypoly(ethyleneoxy) ethanol –58% active ingredient) was used in the kettle charge.

| Sample 12 | |
|---|---|
| Monomer Emulsion #1 | |
| DI water | 297.90 |
| Anionic Surfactant (58% active) | 12.34 |
| Butyl Acrylate | 640.67 |
| Methyl Methacrylate | 275.94 |
| Methacrylic acid | 38.19 |
| 1-Dodecanethiol** | 0.96 |
| Monomer Emulsion #2 | |
| DI water | 297.90 |
| Anionic Surfactant (58% active) | 7.57 |

| Sample 12 | |
|---|---|
| Butyl Acrylate | 62.62 |
| Methyl Methacrylate | 510.88 |
| Methacrylic acid | 11.70 |

**Added 15 minutes into ME feed

For sample 13, the procedure above was followed with the exception that 1.33 g. of an aqueous solution of anionic surfactant (ammonium salt of a sulfate ester of an alkylphenoxypoly(ethyleneoxy) ethanol –58% active ingredient) was used in the kettle charge.

| Sample 13 | |
|---|---|
| Monomer Emulsion #1 | |
| DI water | 297.90 |
| Anionic Surfactant (58% active) | 6.59 |
| Butyl Acrylate | 640.67 |
| Methyl Methacrylate | 275.94 |
| Methacrylic acid | 38.19 |
| 1-Dodecanethiol** | 9.55 |
| Monomer Emulsion #2 | |
| DI water | 297.90 |
| Anionic Surfactant (58% active) | 4.03 |
| Butyl Acrylate | 62.62 |
| Methyl Methacrylate | 510.88 |
| Methacrylic acid | 11.70 |

**Added 15 minutes into ME feed

For sample 14, the procedure above was followed with the exception that 0.53 g. of an aqueous solution of anionic surfactant (ammonium salt of a sulfate ester of an alkylphenoxypoly(ethyleneoxy) ethanol –58% active ingredient ) was used in the kettle charge.

| Sample 14 | |
|---|---|
| Monomer Emulsion #1 | |
| DI water | 297.90 |
| Anionic Surfactant (58% active) | 12.34 |
| Butyl Acrylate | 640.67 |
| Methyl Methacrylate | 275.94 |
| Methacrylic acid | 38.19 |
| 1-Dodecanethiol | 4.77 |
| Monomer Emulsion #2 | |
| DI water | 297.90 |
| Anionic Surfactant (58% active) | 7.57 |
| Butyl Acrylate | 62.62 |
| Methyl Methacrylate | 510.88 |
| Methacrylic acid | 11.70 |

Samples 8–14 and Comparative samples F–G were incorporated into clear waterborne thermoset compositions using the following procedure. To 78.8 g. latex polymer was added, in the order given, with stirring, 7 g. of a 4/3/1 premixture of water/ethylene glycol butyl ether/diethyleneglycol butyl ether, 6.2 g. of aromatic or aliphatic carbodiimide, 2.8 g. of ACRYSOL(R) RM-825 urethane rheology modififer (5% weight solids in water)(ACRYSOL(R) is a trademark of Rohm and Haas Co.), and 14 g. water. The aliphatic carbodiimide bearing at least two carbodiimide groups was UCARLINK(R) XL-29SE (UCARLINK(R) is a trademark of Union Carbide Corp.); the aromatic carbodiimide bearing at least two carbodiimide groups was the reaction product of toluene 2,4-diisocyanate and poly(ethylene glycol) monomethyl ether CARBOWAX(R) 350 (CARBOWAX(R) is a trademark of Union Carbide Corp.)

Each coating composition was adjusted to 23–26 seconds on a #2 Zahn cup. Coating compositions were sprayed according to the procedure of Example 2 under conditions given. Results are presented in Table 5.1–5.3.

TABLE 5.1

Evaluation of cured aromatic carbodiimide-containing compositions

| Polymer | $10^3$ Mn | $10^3$ Mw | Part. size (nm) | bubbles |
|---|---|---|---|---|
| Sample 8 | 32 | 93 | 142 | 0 |
| Sample 9 | 72 | 277 | 147 | 48 |
| Sample 10 | 60 | 297 | 249 | 8 |
| Sample 11 | 67 | 269 | 149 | 28 |
| Comp. H | 66 | 178 | 77 | 116 |
| Comp. I | 63 | 200 | 76 | 124 |
| Comp. J | 41 | 112 | 75 | 76 |

Samples were sprayed at 101 F. and 22% relative humidity.

Samples 8–11 of this invention exhibit lower levels of microfoam than Comparative samples H–J as measured by bubble counting.

TABLE 5.2

Evaluation of cured aromatic carbodiimide-containing compositions

| Polymer | $10^3$ Mn | $10^3$ Mw | Part. size (nm) | bubbles | L* |
|---|---|---|---|---|---|
| Sample 12 | 66 | 259 | 248 | 8 | 3.31 |
| Sample 13 | 40 | 111 | 249 | 4 | 3.77 |
| Sample 14 | 52 | 132 | 141 | 20 | 1.63 |
| Comp. H | 66 | 178 | 77 | 128 | 5.43 |
| Comp. I | 63 | 200 | 76 | 172 | 5.7 |
| Comp. J | 41 | 112 | 75 | 44 | 2.39 |

Samples were sprayed at 103 F. and 16% relative humidity.

Samples 12–14 of this invention exhibit lower levels of microfoam than Comparative samples H–J as measured by bubble counting or color measurement (L*).

TABLE 5.3

Evaluation of cured aliphatic carbodiimide-containing compositions

| Polymer | $10^3$ Mn | $10^3$ Mw | Part. size (nm) | bubbles |
|---|---|---|---|---|
| Sample 11 | 67 | 269 | 149 | 28 |
| Comp. H | 66 | 178 | 77 | 160 |

Samples were sprayed at 103 F. and 16% relative humidity.

Sample 11 of this invention exhibits lower levels of microfoam than Comparative sample H as measured by bubble counting.

EXAMPLE 6

Preparation of clear waterborne thermoset compositions containing emulsion-polymerized single- and multi-staged addition polymers of various particle sizes and molecular weights bearing at least two carboxylic acid first reactive groups and a reactive modifier bearing at least two aziridine second reactive groups.

Samples 5–7 and 12 and Comparative samples F–I were incorporated into clear waterborne thermoset compositions using the following procedure. To 85.3 g. latex polymer was added, in the order given, with stirring, 7 g. of a 4/3/1 premixture of water/ethyleneglycol butyl ether/diethyleneglycol butyl ether, 2.0 g. of XAMA(R)-7 polyaziridine (XAMA(R) is a trademark of EIT Inc.; the XAMA(R)-7 used was purchased from Sancor Industries, Inc.), 6.0 g. of ACRYSOL(R) RM-825 urethane rheology modififer (1% weight solids in water)(ACRYSOL(R) is a trademark of Rohm and Haas Co.), and 10.4 g. water. Each coating composition was adjusted to 23–26 seconds on a #2 Zahn cup. Coating compositions were sprayed according to the procedure of Example 2 at 99 F. and 20% relative humidity.

TABLE 6.1

Evaluation of cured aziridine-containing compositions incorporating single-staged addition polymers bearing carboxylic acid first reactive groups.

| Polymer | $10^3$ Mn | $10^3$-Mw | Part. size (nm) | bubbles | L* |
|---|---|---|---|---|---|
| Sample 5 | 82 | 426 | 200 | 392 | 9.07 |
| Sample 6 | 26 | 41 | 159 | 292 | 7.08 |
| Sample 7 | 67 | 173 | 138 | 292 | 11.6 |
| Comp. F | 74 | 318 | 74 | 292 | 11.6 |
| Comp. G | 28 | 47 | 77 | 444 | 17.6 |

Samples 5–6 of this invention exhibit lower levels of microfoam than Comparative samples F–G as measured both by bubble counting or color (L*) measurement.

TABLE 6.2

Evaluation of cured aziridine-containing compositions incorporating two-staged addition polymers bearing carboxylic acid first reactive groups.

| Polymer | $10^3$ Mn | $10^3$ Mw | Part. size (nm) | bubbles | L* |
|---|---|---|---|---|---|
| Sample 12 | 66 | 259 | 248 | 184 | 6.71 |
| Comp. H | 66 | 178 | 77 | 364 | 16.53 |
| Comp. I | 63 | 200 | 76 | >500 | 20 |

Sample 12 of this invention exhibits lower levels of microfoam than Comparative samples H–I as measured by bubble counting or color measurement (L*).

What is claimed is:

1. A method for reducing the amount of microfoam in a spray-applied clear waterborne thermoset composition comprising:

forming said clear waterborne thermoset composition comprising an emulsion-polymerized addition polymer with an average particle diameter of greater than about 120 nanometers, said polymer bearing at least two first reactive groups; and a reactive modifier bearing at least two second reactive groups, said second reactive groups being reactive with said first reactive groups to form a covalent bond;

applying said thermoset composition to a substrate using a spray method, whereby a clear coating is formed; and curing said thermoset composition.

2. The method of claim 1 wherein said emulsion-polymerized addition polymer has a GPC weight average molecular weight from about 10,000 to about 150,000.

3. The method of claim 1 or claim 2 wherein said emulsion-polymerized addition polymer comprises multistaged emulsion-polymerized addition polymer particles, said particles having an inner phase and an outer phase.

4. The method of claim 3 wherein said emulsion-polymerized addition polymer has an average particle diameter from about 120 nanometers to about 200 nanometers.

5. The method of claim 1 wherein said first reactive groups are selected from the group consisting of hydroxyl groups, acetoacetate groups, and amino groups; and wherein said second reactive groups are isocyanate groups.

6. The method of claim 1 wherein said first reactive groups are carboxylic acid groups; and wherein said second reactive groups are carbodiimide groups.

7. The method of claim 1 wherein said first reactive groups are carboxylic acid groups; and wherein said second reactive groups are aziridine groups.

8. A substrate bearing a cured spray-applied clear waterborne thermoset coating with reduced amount of microfoam, said clear coating formed by the method of claim 1 or claim 2 or claim 3.

* * * * *